Patented Sept. 2, 1941

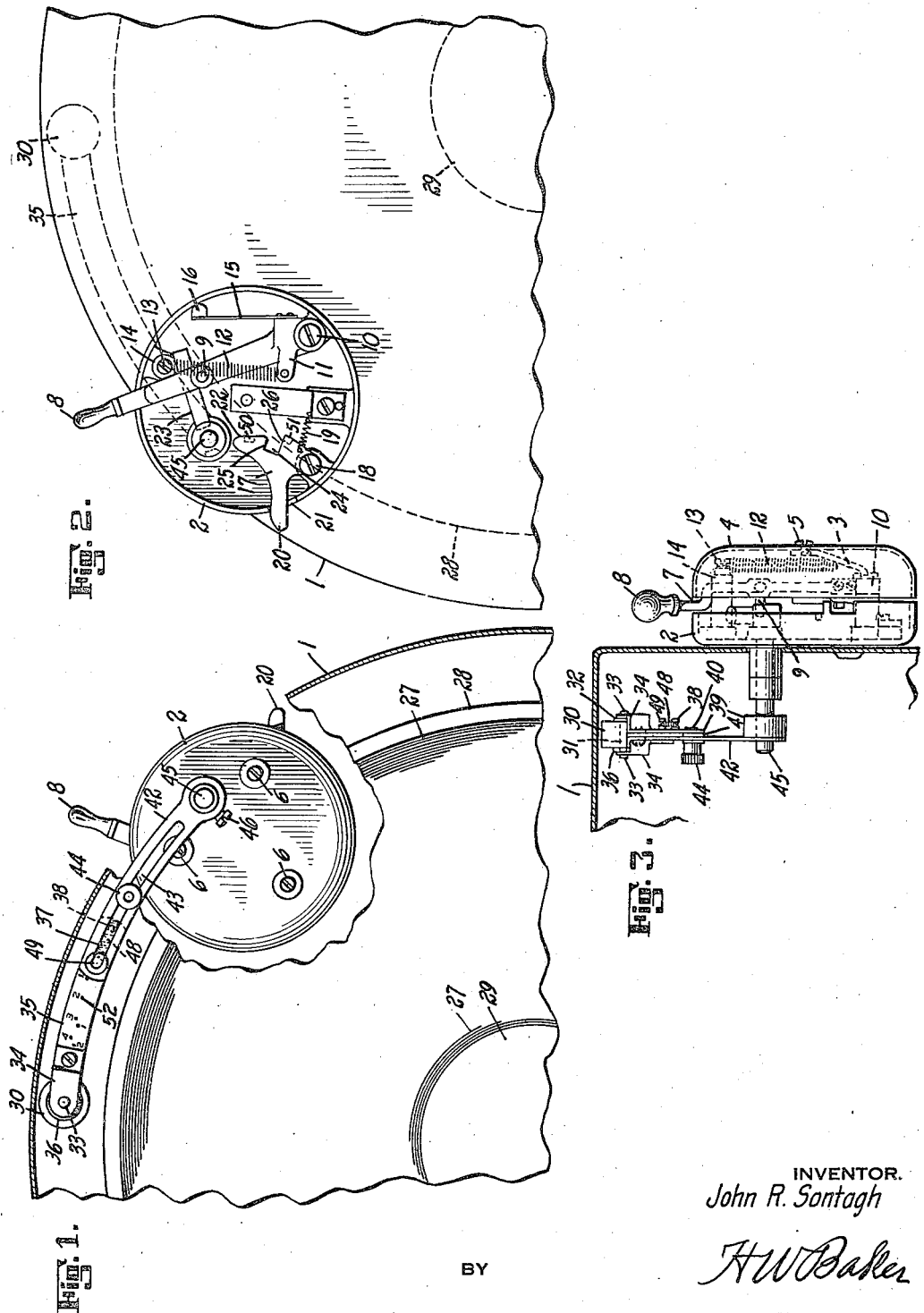

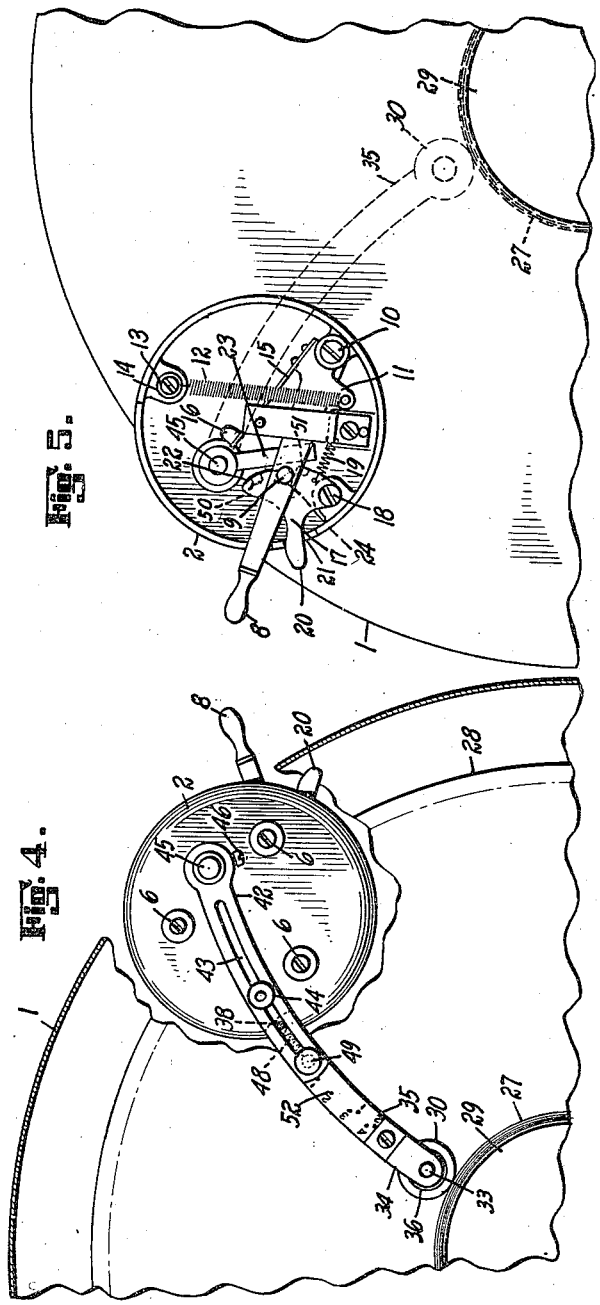

2,254,326

UNITED STATES PATENT OFFICE 2,254,326

BELL RINGING APPARATUS

John R. Sontagh, Great Kills, Staten Island, N. Y., assignor to International Projector Corporation, New York, N. Y., a corporation of Delaware Application August 26, 1938, Serial No. 226,890

10 Claims. (Cl. 116—67)

The object of this invention is to provide a bell mechanism which is controlled by the amount of film remaining in a film magazine, and is so designed as to provide an arm which will follow the outer periphery of the film roll until the film roll has been substantially used up, at which time the arm will be released and will set in operation a mechanism to ring a bell.

Another object of the invention is to provide latching means so that the follower arm will be held in an elevated position above the reel when it is desired to insert a new reel or to take off the reel from which the film has been unwound.

Another object of the invention is to prevent the effective operation of the latching means if it is attempted to latch the same when there is no film in the magazine.

Another object of the invention is to provide automatic means to return the follower arm to an elevated position when the bell is rung so as to relieve the operator from the necessity of raising this arm in order to remove the reel.

Another object of the invention is to provide means whereby the arm may be adjusted so that its length will be varied in accordance with the size of the hub of the reel and calibrated means to indicate the precise position to which one section of the arm should be moved relative to the other section of the arm in order to accommodate hubs having different diameters. This indicator means indicates the amount of film remaining on the film roll; that is, it indicates that the operator has enough film to run the machine in normal operation for given numbers of minutes or it might indicate the footage remaining on the roll.

Other objects and advantages of the invention will appear in the detailed specification and the claims which follow.

The invention may be better understood by referring to the attached drawings which show one form of the invention by way of illustration and not by way of limitation, in which drawings, Fig. 1 is a side elevational view of a film magazine with the door not shown and the back plate cut away in part to show the rear of the bell housing and having my invention incorporated therein, Fig. 2 is a side elevational view of the reverse side of the structure shown in Fig. 1, but with the cover for the bell removed, Fig. 3 is a view taken at right angles to Fig. 2 and showing only the upper portion of the structure shown in Fig. 2, Fig. 4 is a view similar to Fig. 1 but showing the follower arm in depressed position when practically all of the film has been unwound, Fig. 5 is a view similar to Fig. 2 but showing the position of the parts when practically all of the film has been unwound, Fig. 6 is a plan view of the structure shown in Fig. 4, and Fig. 7 is a perspective view of the latching arm.

In the drawings the magazine 1 is, of course, stationary and is merely a circular housing provided with the conventional door which door is not shown in the drawings as it forms no part of the invention. Secured to one wall of the magazine is a base 2 of the bell housing, which base supports an arm 3 which is attached to the center of the bell cover 4 by means of a screw 5 and conventional means, such as a screw 6, may be employed to secure the base 2 to the magazine. It will be noted in Fig. 3 that there is a substantial space between the base 2 and the skirt of the bell cover 4 and through this space or opening 7 (Figs. 3 and 6) extends a lever 8 which may be grasped by the operator and moved back and forth. This lever is provided with a lug 9 and the lever is pivoted on a stud 10. It is provided with an arm 11 to which is attached a spring 12 having its other end anchored on a stud 13 which is surrounded throughout the major portion of its length by a resilient bumper 14 which might be made of any resilient material, such as rubber, Duprene or any other resilient material. Secured to the lever 8 near its pivot point is a spring arm 15 which carries a clapper 16. It is obvious that if the lever 8 were moved from the position shown in Fig. 2 to that shown in Fig. 5 and was then released, the spring 12 would pull the said lever until it struck the bumper 14 and the clapper 16 would tend to be projected against or would strike the bell cover 4 thereby ringing the said bell.

A catch 17 is pivoted on a stud 18 and is urged clockwise as viewed in Figs. 2 and 5 by means of a spring 19 which is a rather weak spring and which may be easily overcome if the arm 20 projecting through a slot 21 is operated manually or if the lug 9 engages the cam surface 22 thereof, or if the lever arm 23, hereinafter to be described, should contact one of the laterally extending lugs carried by the catch 17. The said catch is provided with a slot 24 which terminates in an upper wall 25 and a lower wall 26. The lower wall 26 is considerably longer than the wall 25, as will be noted in Fig. 2. When the lever is moved from the position shown in Fig. 2 to that shown in Fig. 5, the lug 9 engages the cam surface 22 and rotates the catch 17 on its pivot stud in a counter clockwise direction as viewed in Fig. 2 until the lug 9 is adjacent the slot 24, and thereupon the spring 19 pulls the catch so that the wall 25 will overlie the stud 9. The lower wall 26 serves as a means to prevent the lever being moved below the point where the stud 9 would be in alignment with the slot 24. The said lever would, therefore, be held in its depressed position as is shown in Fig. 5. After being once engaged in the slot 24 the catch would, of course, hold the lever 8 in the position shown in Fig. 5 until the catch is rotated anti-clockwise as viewed in Fig. 2 so as to release the lug 9 so that the spring 12 could pull the lever 8 into the position shown in Fig. 2 and cause the clapper 16 to strike the bell.

The film 27 is, of course, wound on a reel 28 provided with a hub 29. As the film is unwound from the supply reel the diameter of the film roll, of course, decreases and heretofore the operator might run entirely out of film without realizing it until all the film had actually been unwound from the supply reel. In order to warn him that he is approaching the end of the film I have provided a follower arm provided with a film contacting roller, which will release the catch when he has only a predetermined amount of film left on the reel, resulting in the bell being rung at this point. I have provided a roller 30, preferably made of felt or some material which will not scar the film. This roller is mounted on a hub 31 which carries a flange 32 and two bearing spindles 33 which project in opposite directions and are received within arms 34 secured to an arm 35. A washer 36 is mounted on the hub 31 on the opposite side of the roller from the flange 32. The arm 35 is provided with a closed slot 37 and a pin 38 beyond the slot. A plate 39 lies along the arm 35 and extends beyond the same. At one end it is provided with a threaded pin 40 secured to the said plate 39, which pin is provided with a spacing washer 41 between the plate 39 and a lever arm 42. The pin 40 extends through a relatively long slot 43 in the lever arm 42 and its threaded arm receives a holding knob 44. When the holding knob 44 is screwed downwardly, it of course locks the plate 39 to the lever arm 42, but if it is released, the plate 39 and arm 35 can be moved so as to shorten or lengthen the distance between the shaft 45 and the roller 30, the arm 42 being adjustably secured on the shaft 45 by means of a set screw 46. The pin 38 carried by the arm 35 projects through a slot 47 in the plate 39 and a spring 48 extends from the pin 38 to a pin 49 carried by the plate 39 and which extends through the slot 37 in the arm 35 and through the slot 43 in the arm 42. The arms 42 and 35 and the plate 39 together form a lever, the length of which may be adjusted by the operator by releasing the holding knob 44 and moving the plate 39 and arm 35 longitudinally of the slot 42 either toward or away from the shaft 45.

The function of the spring 48 and the plate 39 together with the pin 49 and the slot 37 is as follows. When the film roll has been almost consumed as, for instance, shown in Figs. 4 and 5, it is possible that the film roll may not be a perfect circle and it is to be noted that the roller 30 is approaching very close to the center line between the film hub and the shaft 45. If the film reel should not be a perfect circle so that the radii were not equal, having major and minor radii in different parts thereof, the film, when a major radius was beneath or approaching the roller 30, would press against the roller and the spring 48 would yield, which would in effect be temporarily shortening the length of the lever, but as the minor radius was approaching, the spring would pull on the pin 38 and maintain the roller in contact with the film.

Secured to the shaft 45 is the lever arm 23, but the lever arm 23 is within the bell housing. This lever arm 23 abuts against the bumper 14 when the parts are in the position shown in Fig. 2 and overlies the lug 9 of the lever 8. When the parts are in this position it would, therefore, be impossible to move the roller carrying lever downwardly by simply pressing downwardly on the roller carrying lever, for this movement would be opposed by the lug 9. The parts are held in this position so that the roller 30 is above the outer peripheral edges of the reel when it is desired to insert a new reel or remove an old one. After the reel had been inserted and it is desired to lower the roller 30 into contact with the film, the lever 8 is moved from the position shown in Fig. 2 to that shown in Fig. 5 so that the lug 9 is seated in the slot 24 and the upper wall 25 of the slot holds the lever 8 in this position against the tension of the spring 12. The roller 30 is now free to fall by gravity into contact with the film, and as the film is used up the roller 30 will follow the outer periphery of the film and the lever arm 23 will be moved clockwise as viewed in Fig. 2. Eventually the parts assume the position shown in Figs. 4 and 5, in which position practically all of the film has been used up. There is a predetermined point, of course, in which there would not be sufficient film remaining on the reel to prevent the roller carrying lever from dropping so that the lever would be hanging down below the shaft 45. As it makes this downward swing after being released from the film, it would acquire a certain momentum and, of course, the lever arm 23 moves with it. This lever arm 23 engages and strikes an upper lug 50 which is carried by the catch 17 above the slot 24, thereby rotating the catch 17 counter clockwise as viewed in Fig. 2 and releasing the lug 9 of the lever 8 so that the said lever 8 is pulled into the position shown in Fig. 2 by means of the spring 12 and the clapper 16 strikes the bell.

There is also a lug 51 carried by the catch 17. The function of this lug 51 is to prevent the catch from engaging the lug 9 and holding the lever 8 in depressed position in case there is no film in the magazine. There would be nothing to prevent the operator from moving the lever 8 from the position shown in Fig. 2 to the position shown in Fig. 5 regardless of whether or not there was any film on the reel, but if he did so, the lug 9 would engage the cam surface 22 and would rotate the catch 17 and the roller carrying lever would fall, moving downwardly the lever arm 23 which lever arm would engage the lug 51 and prevent the catch 17 from moving clockwise as viewed in Fig. 2, and thereby prevent the wall 25 from overlying the lug 9 so that when the lever 8 was released the spring 12 would return it and the roller carrying lever to the position shown in Fig. 2.

On the arm 35 I have placed two rows of indicia 52, the upper row reading 4, 3, 2, 1. These numerals represent marks which are spaced apart and are so placed thereon that if the mark by the numeral 1 is positioned at the extreme end of the arm 42, it will indicate that the length of the roller carrying lever is such that the said lever will drop when there remains on the reel only enough film to operate for one minute, that is, that the bell will be rung when all of the roll of film has been used except to continue operation for one minute. If it is desired for the bell to ring when there is only enough film remaining to operate for longer periods of time, such as 2, 3, or 4 minutes, the proper markings are placed at the extreme end of the lever arm 42 to indicate that number of minutes. The reason that I have shown two sets of numerals is to accommodate reel hubs of different diameter. For instance, the upper row of numerals might be used where the diameter of the hub of the reel is four inches and the lower set of numerals might be employed if the hub of the reel is five inches in diameter. Instead of indicating the amount of film which would operate for a predetermined number of minutes, the indicia might be changed so as to indicate the number of feet of film remaining on the reel at the time that the bell is rung.

While I have shown my invention in what I consider to be a preferred form in these drawings and have described it in this specification, I realize that many changes might be made in the specific form shown herein by way of illustration and I, therefore, desire to claim the same broadly except as I may limit myself in the appending claims.

Having now described my invention, I claim:

1. In a reel alarm, a first lever, a stop for said lever, a spring acting on said lever and tending to rotate it towards said stop, a latch to hold said lever in position retracted from said stop, a second lever supported at its end remote from its pivot by a film roll, said film roll releasing the free end of the second lever so that it can swing downwardly by gravity when the size of the roll is sufficiently decreased by film being unwound therefrom, means carried by said second lever which contacts the film to release said latch when the said second lever is released from the roll, a bell and means to sound said bell when the first lever is released and its spring rotates the said first lever against its stop.

2. In a reel alarm, a first lever, a stop for said lever, a spring acting on said lever and tending to rotate it towards said stop, a latch to hold said lever in position retracted from said stop, a second lever supported at its end remote from its pivot by a film roll, said film roll releasing the free end of the second lever so that it can swing downwardly by gravity when the size of the roll is sufficiently decreased by film being unwound therefrom, means carried by said second lever which contacts the film to release said latch when the said second lever is released from the roll, a clapper carried by said first lever, a bell, said spring serving as a means to pull the first lever against its stop and to move said clapper into contact with said bell when the second lever is released and swings downwardly.

3. In a reel alarm, a lever, a stop for said lever, a clapper carried by said lever, a bell, means tending to move said lever toward said stop and said clapper into contact with the bell, a catch to hold said lever removed from the bell, a film roll contacting lever adapted to swing downwardly by gravity when the film roll is sufficiently decreased in size by having film unwound therefrom, and means controlled by said film roll contacting lever to release said catch from the first-named lever so that the said first-named means will cause said clapper to strike said bell.

4. As a subcombination of a reel alarm, a lever consisting of two relatively movable parts so that said lever may be lengthened or shortened, means to connect said parts together resiliently, a reel hub adapted to have film wound thereon, the film roll serving normally as a support for the free end of said lever, said resilient connection between the two parts of the lever being adapted to yield if the lever should contact a bulge in the roll.

5. As a subcombination of a reel alarm, a pivoted arm, a pivot therefor, a plate, means to secure said plate on said arm in any of a plurality of positions, a pin carried by the plate, a slotted slidable arm forming in effect, an extension of said arm and plate, said pin extending through the slot in said arm, a spring connected to the slidable arm and the pin on the plate and tending to move the slidable arm as far as possible from the pivot, a roll contacting roller carried by the slidable arm, said spring yielding if there should be a bulge on the roll acting to overcome the tension of the spring.

6. In a reel alarm, a lever, a film roll normally supporting said lever, said roll releasing said lever so that the lever may drop by gravity when the roll is decreased to a predetermined size, a spring acting on said lever to elevate the lever, means to prevent the operation of said spring until the lever is dropped and an arm controlled by the lever to release said means when said lever drops so that the spring will elevate said lever and hold it in its elevated position.

7. In a reel alarm, a film roll contacting lever, said roll releasing said lever so that it may swing downwardly by gravity when the roll is decreased to a predetermined size, a bell, a striker for said bell, a spring to cause said striker to strike said bell and to elevate said lever and hold it in fully elevated position after it is released and has swung downwardly and a latch to restrain the actuation of said spring, said latch being released by the said lever when it is released from the roll.

8. In a reel alarm, a pivoted lever adapted to be supported at its free end by a roll of film, said lever extending laterally from its pivot point, said lever being adapted to be released from the roll when the radius of said roll is decreased beyond a predetermined length and to swing downwardly by gravity when released, a bell, a spring controlled by the lever whereby the bell is sounded when the lever is released and swings downwardly, and whereby said lever after being released is automatically elevated and a latch to restain the actuation of said spring and released by the said lever when it is released from the roll.

9. In a reel alarm, a film roll contacting lever, said roll releasing said lever so that it may drop by gravity when the roll is decreased to a predetermined size, a spring actuated means controlled by the dropping of said lever to elevate said lever and hold it in elevated position after it is released and drops and to actuate an alarm, and means controlled by the dropping of said lever to release said means.

10. In a reel alarm, a film roll contacting lever, said roll releasing said lever so that it may drop by gravity when the roll is decreased to a predetermined size, means to elevate said lever and hold it in elevated position after it is released and dropped, said means including a tension spring, a holding lever whereby said spring is placed under tension, a catch to hold said last named lever so that said spring is under tension, said roll contacting lever when released from the roll so that it falls by gravity, releasing said catch so that said spring returns said holding lever to a position to decrease the tension of the spring and means whereby the return movement of the holding lever elevates the roll contacting lever so that it will be out of the way when a new roll is to be inserted below the same.

JOHN R. SONTAGH.